US011196059B2

(12) United States Patent
Reissig et al.

(10) Patent No.: US 11,196,059 B2
(45) Date of Patent: Dec. 7, 2021

(54) FUEL CELL SYSTEM

(71) Applicants: AVL List GmbH, Graz (AT); Nissan Motor Co., Ltd., Yokohama (JP)

(72) Inventors: Michael Reissig, Seiersberg (AT); Bernd Reiter, Kainbach bei Graz (AT); Jörg Mathé, Graz (AT); Thomas Krauss, Graz (AT); Stefan Planitzer, Frohnleiten (AT); Vincent Lawlor, Graz (AT); Jürgen Rechberger, Graz (AT); Masanari Yanagisawa, Kawasaki (JP); Shinichi Miyazaki, Yokohama (JP); Hayato Chikugo, Yokohama (JP); Tadaki Mano, Sagamihara (JP); Tatsuya Yaguchi, Yokohama (JP)

(73) Assignees: AVL List GmbH, Graz (AT); Nissan Motor Co., Ltd., Yokohama (JP)

( * ) Notice: Subject to any disclaimer, the term of this patent is extended or adjusted under 35 U.S.C. 154(b) by 331 days.

(21) Appl. No.: 16/464,305

(22) PCT Filed: Nov. 29, 2017

(86) PCT No.: PCT/EP2017/080858
§ 371 (c)(1),
(2) Date: May 28, 2019

(87) PCT Pub. No.: WO2018/099993
PCT Pub. Date: Jun. 7, 2018

(65) Prior Publication Data
US 2019/0379069 A1    Dec. 12, 2019

(30) Foreign Application Priority Data
Nov. 29, 2016    (AT) .............................. A 51081/2016

(51) Int. Cl.
H01M 8/04014    (2016.01)
H01M 8/04089    (2016.01)
(Continued)

(52) U.S. Cl.
CPC .... *H01M 8/04022* (2013.01); *H01M 8/04089* (2013.01); *H01M 8/04201* (2013.01); *H01M 8/0618* (2013.01); *H01M 2008/1293* (2013.01)

(58) Field of Classification Search
CPC ......... H01M 8/04022; H01M 8/04089; H01M 8/04201; H01M 8/0618
See application file for complete search history.

(56) References Cited

U.S. PATENT DOCUMENTS

2003/0235731 A1*  12/2003  Haltiner, Jr. ...... H01M 8/04089
                                                          429/434
2004/0241515 A1    12/2004  Brenner et al.
(Continued)

FOREIGN PATENT DOCUMENTS

DE    102011121691    6/2013
EP    2863462          4/2015
(Continued)

OTHER PUBLICATIONS

International Search Report and the Written Opinion dated Feb. 13, 2018 From the International Searching Authority Re. Application No. PCT/EP2017/080858. (14 Pages).
(Continued)

*Primary Examiner* — Olatunji A Godo (57) ABSTRACT

The invention relates to a fuel cell system (100) having a fuel supply unit (8) and fuel cells (1, 2) having a cathode (4, 4') and an anode (3, 3'), wherein the cathode (4, 4') features a cathode feed line (40), the anode (3, 3') features an anode feed line (30), and the flow in the anode (3, 3') is connected with the flow in the fuel supply unit (8) via the anode feed (Continued)

line (30), in which a reforming apparatus (13) is arranged, and having an anode exhaust line (6) provided with at least one burner apparatus (22, 23). According to the invention, a first heat exchanger (16) is provided in the cathode feed line (40), and a second heat exchanger (29), which is arranged upstream of the reforming apparatus (13), is provided in the anode feed line (30), wherein the anode exhaust line (6) divides downstream of the burner apparatus (22, 23) into a first anode exhaust subsidiary line (6a) and a second anode exhaust subsidiary line (6b), each of which is connected to an exhaust gas outlet (21), and wherein the first anode exhaust subsidiary line (6a) leads through a warm side of the first heat exchanger (16), and the second anode exhaust subsidiary line (6b) leads through a warm side of the second heat exchanger (29), and the vaporizing arrangement (12) is able to be heated via the second anode exhaust subsidiary line (6b).

14 Claims, 3 Drawing Sheets

(51) Int. Cl.
*H01M 8/04082* (2016.01)
*H01M 8/0612* (2016.01)
*H01M 8/124* (2016.01)

(56) References Cited

U.S. PATENT DOCUMENTS

| | | |
|---|---|---|
| 2009/0169931 A1 | 7/2009 | Qi |
| 2010/0203404 A1 | 8/2010 | Miyazaki |
| 2016/0204453 A1 | 7/2016 | Kanao et al. |

FOREIGN PATENT DOCUMENTS

| | | |
|---|---|---|
| EP | 2985830 | 2/2016 |
| JP | 2008-277280 | 11/2008 |

OTHER PUBLICATIONS

Vorbescheid und Recherchenbericht [Preliminary Notification and Search Report] dated Oct. 12, 2017 From the Österreichisches Patentamt [Austrian Patent Office] Re. Application No. A 51081/2016 and Its Translation Into English. (6 Pages).

* cited by examiner

FUEL CELL SYSTEM

RELATED APPLICATIONS

This application is a National Phase of PCT Patent Application No. PCT/EP2017/080858 having International filing date of Nov. 29, 2017, which claims the benefit of priority of Austrian Patent Application No. A 51081/2016 filed on Nov. 29, 2016. The contents of the above applications are all incorporated by reference as if fully set forth herein in their entirety.

FIELD AND BACKGROUND OF THE INVENTION

The invention relates to a fuel cell system comprising a fuel supply unit, at least one fuel cell having one cathode and one anode, whereby the cathode features a cathode feed line, the anode features an anode feed line, the anode flow is connected via the anode feed line with the fuel supply unit flow, and a reforming apparatus is arranged in the anode feed line, and comprises an anode exhaust gas line for the discharging of at least anode exhaust gas coming from the anode, whereby at least one combustion apparatus is arranged in the anode exhaust gas line.

A fuel cell system, for example used as an auxiliary power supply in motor vehicles or as an "APU" (auxiliary power unit), normally comprises at least one fuel cell for the generation of electrical current from cathode air and fuel gas or reformed gas. In this case, a fuel cell of this kind is assembled from many individual fuel cell elements stacked one upon the other and called a fuel cell stack. A fuel cell, in particular a high-temperature fuel cell, is understood by one skilled in the art as, for example, a Molten Carbonate Fuel Cell (MCFC), which works at operating temperatures of between approximately 580° C. and 675° C. Usually used as an electrolyte in fuel cells of this kind is a mixed alkali carbonate melt consisting of lithium and potassium carbonate. Solid Oxide Fuel Cells (SOFC) are known as well. Solid oxide fuel cells work at operating temperatures of between approximately 650° C. and 1000° C.

The electrolyte in this type of cell consists of a solid ceramic material capable of conducting oxygen ions while having an insulating effect on electrons. The electrodes as well as the cathode and the anode are attached to both sides of the electrolyte layer. They are gas-permeable conductors of electricity. The electrolyte for conducting oxygen ions is designed, for example, as a thin membrane, allowing it to transport the oxygen ion using little energy and at the aforementioned high temperatures. The outer side of the cathode facing away from the electrolyte is surrounded by air (hereinafter referred to as, inter alia, cathode gas), and the outer side of the anode is surrounded by fuel gas or reformed gas. Unused air and unused fuel gas as well as combustion products are discharged, for example, by means of suction.

In order to generate reformed gas, the fuel cell system can be equipped with a reforming apparatus, which generates the reformed gas from a fuel, usually a hydrocarbon such as natural gas, diesel or an alcohol, as well as, optionally, from reformed air and/or water vapor. The reformed gas contains, among other things, hydrogen gas and carbon monoxide. The reformation process can in this case take place in a separate reforming apparatus, but may also take place in the fuel cell itself. In addition, the fuel cell system may also be equipped with an air supply apparatus, which uses suction to draw ambient air surrounding the fuel cell system by means of an air conveying arrangement and separating the air, for example, into reformed air and cathode air. The reformed air can be led to the reformer via a reformer air line, while the cathode air can be led via a cathode feed line to the cathode side of at least one fuel cell.

A fuel cell system with evacuation passages and a controller for operating the valves and an operation method of a fuel cell system is known from the invention JP 2008 277 280 A.

SUMMARY OF THE INVENTION

One disadvantage of the known solutions is the fact that much of the energy obtained in the fuel cells escapes as waste heat into the environment via the anode exhaust. High but theoretically feasible levels of efficiency cannot, therefore, be achieved using fuel cell systems of this kind.

Therefore, one object of the invention is to remedy these prior art disadvantages and to provide a fuel cell system with a high level of efficiency.

This object will be achieved by means of the aforementioned fuel cell system according to the invention in that at least one first heat exchanger is arranged in the cathode feed line, at least one vaporizing apparatus and a second heat exchanger are arranged in the anode feed line, and the vaporizing apparatus is arranged upstream of the reforming apparatus, whereby the anode exhaust line divides downstream of the burner apparatus into a first anode exhaust subsidiary line that is connected to an exhaust outlet, and a second anode exhaust subsidiary line that is connected to an exhaust outlet, whereby the first anode exhaust subsidiary line is led through a warm or hot side of the first heat exchanger, and the second anode exhaust subsidiary line is led through a warm side of the second heat exchanger, and the vaporizing apparatus is able to be heated via the second anode subsidiary exhaust line.

Within the scope of the present invention, a heat exchanger is understood in particular as an apparatus for the indirect transfer of heat in which material flows having different temperature levels are physically separated by means of a heat-permeable wall. The aim thereby is the transfer of heat from the warmer to the cooler material flow, whereby the colder or cooler side of the heat exchanger is understood as the area of the cooler material flow, while the hotter side of the heat exchanger is understood as area of the warmer material flow.

A vaporization apparatus in terms of the invention refers to a special type of heat exchanger in which a medium's state of matter is changed by means of transferring heat from a physically separate moving material flow, whereby, in particular, a liquid medium reaches its gaseous phase.

One apparent advantage of the invention is making waste heat from the fuel cell reaction in the anode exhaust efficiently usable by means of the routing and the arrangement of the anode exhaust line and by means of division into parallel flows running through the first and second anode exhaust subsidiary lines. The high-temperature anode exhaust flows through both the reforming apparatus and the vaporizing apparatus as well as through the two heat exchangers. The heat from the anode exhaust is thus ideal for interaction with or heat transfer to streams in the anode feed line and the cathode feed line. By means of dividing the anode exhaust line into first and second anode exhaust lines, adequate heat for thermal transfer is able to be applied to each of these elements, and the mass streams are able to be adjusted or regulated according to operational need.

A medium, in particular air, is fed into the cathode feed line and flows through a cold side of the first heat exchanger, whereas the anode exhaust flows through the first anode exhaust subsidiary line on the warm side of the same heat exchanger. As a result, the anode exhaust gives up heat, which is absorbed by the medium being fed into the cathode feed line. A corresponding process also takes place in the second anode exhaust subsidiary line, in which the warm anode exhaust flows through the warm sides of the second heat exchanger and through a warm side of the vaporizing apparatus, whereby the anode exhaust exchanges heat with the medium, in particular fuel, being fed into the anode feed line.

In addition, thermal energy necessary for the reforming reaction—and for endothermic reformation in particular—is also supplied to the reforming unit.

Dividing the anode exhaust line into essentially parallel flows through two anode exhaust subsidiary lines also reduces the loss of pressure in the fuel cell system, further increasing the level of efficiency.

Advantageously, the fuel supply unit features a fuel tank in which the fuel is stored. In principle, the fuel cell system according to the invention can be operated using any kind of fuel, in particular a liquid hydrocarbon such as natural gas or diesel, or an alcohol such as ethanol. It is particularly advantageous for the fuel to be made from a mixture of water and ethanol. This can in particular be supplied to the fuel supply unit already mixed, but it can also be beneficial for separate tanks to be provided for water and ethanol, respectively. If two tanks are provided, then it is advantageous to provide a mixing apparatus for mixing the water and the ethanol.

In principle, the ends of the first and the second anode exhaust subsidiary lines can each feature their own exhaust outlets. However, in a variation of the invention, the first anode exhaust subsidiary line and the second anode exhaust subsidiary line lead into a common exhaust outlet. The anode gas is discharged into the environment via the exhaust outlet, whereby, as a result of interacting with the various elements, a large part of the heat from the anode exhaust gets transferred, thus avoiding high demands on the materials used for the exhaust outlet and reducing manufacturing costs.

Advantageously, a first control valve apparatus is provided in the first anode exhaust subsidiary line, preferably downstream of the warm side of the first heat exchanger, and/or a second control valve apparatus is provided in the second anode exhaust subsidiary line, preferably downstream of the vaporizing apparatus. Doing so allows manipulation or regulation of the flow rate of the anode exhaust through the first and the second anode exhaust subsidiary lines. Doing so additionally allows the flow of the anode exhaust through one of the two anode exhaust subsidiary lines to be completely stopped. The dissipation of heat into the various elements of the fuel cell system, and, as a consequence, into the media being fed into the cathode feed line and the anode feed line, can be precisely regulated and can be adapted to a variety of operational scenarios.

In addition, or as an alternative to the control valve apparatuses, the anode exhaust subsidiary lines can, in order to control the mass flow, be designed to have a variety of geometries, cross-sectional surfaces or diameters. For example, the first anode exhaust subsidiary line can, in order to ensure a high degree of heat transfer to the material flow being fed to the cathode, be designed to have a larger diameter than the second anode exhaust subsidiary line.

It is advantageous for the anode exhaust being fed into the second anode exhaust subsidiary line to flow through the reforming apparatus so as to transfer heat to the reforming apparatus. Said another way, both the material stream being fed into the anode feed line and the anode exhaust are led through the reforming apparatus, and a heat-permeable means of physically separating the material streams is provided thereby. Thus, the reforming apparatus and, in particular, the material flow led through it in the direction of the anode(s) is heated so as to achieve temperature levels necessary for a proper reforming reaction.

In a variation of the invention, the second heat exchanger is designed as a superheater for heating the fuel to a temperature greater than 350° C., or to a temperature level necessary for the reforming reaction. A superheater is understood in particular as a heat exchanger which heats a material flow to the temperature required for a reforming reaction.

Advantageously, the second heat exchanger and the reforming apparatus are combined into a common component, the superheating and reforming element. As a result, the warm anode exhaust being fed into the second anode exhaust subsidiary line simultaneously applies heat to the second heat exchanger and to the reforming apparatus, thus bringing the material flow being fed to the temperature required for the reforming reaction and reforming said flow.

In a further variation of the invention, the second heat exchanger and the vaporizing apparatus are combined into a common component, the vaporizing and superheating element (12a). As a result, the warm anode exhaust being fed into the second anode exhaust subsidiary line simultaneously applies heat to the second heat exchanger and the vaporizing apparatus. As a consequence, the fuel being fed into the anode feed line is simultaneously vaporized and superheated.

Such combination components are particularly advantageous in applications providing only a small amount of space for the fuel cell system, for example in the case of vehicles. This also prevents heat loss in the piping between the vaporizing apparatus and the superheater as well as the potential condensation of the vaporized fuel.

It is particularly beneficial if, subsequent in the direction of flow to the burner apparatus, anode exhaust is able to flow through the reforming apparatus prior to the second heat exchanger, whereby anode exhaust is preferably able to flow through the vaporizing apparatus subsequent to the second heat exchanger. In this way, the heat energy from the anode exhaust can be used particularly efficiently and brought to the locations in the fuel cell system where it is needed. The anode exhaust initially flows through the reforming apparatus, providing the amount of heat necessary for the reforming reaction before going on to flow through the second heat exchanger and the vaporizing apparatus. As a result, all of the heat energy from the anode exhaust being fed to the second anode exhaust subsidiary line can be optimally used.

Advantageously, the anode exhaust line divides downstream of the reforming apparatus into the first anode exhaust subsidiary line and the second anode exhaust subsidiary line, whereby the anode exhaust flows through the reforming apparatus subsequent to the burner apparatus.

Beneficially, the burner apparatus is a catalytic burner or a start burner unit having an ignition apparatus, or a combined element comprising a catalytic burner and a start burner apparatus. The burner apparatus is designed as a catalytic burner used for burning fuel residues and other byproducts of the fuel cell reaction that are in the anode exhaust. Depending on the fuel being used, the anode exhaust consists of, for example, about 80 percent water and carbon dioxide and about 20 percent hydrogen and carbon monoxide. The catalytic burner likewise converts the 20 percent hydrogen and carbon monoxide into water and carbon dioxide. In addition, a start burner apparatus or a separate start burner having such a start burner apparatus can be provided. However, this can also be provided in a line running between the fuel supply and the anode exhaust line and discharging into the anode exhaust line downstream of the burner apparatus. It is also possible to combine a catalytic (after-) burner and a start burner apparatus having a separate fuel supply into a common element.

In one variation of the invention, a start burner fuel line is provided between the fuel supply unit and the anode exhaust line, with a start burner fuel metering arrangement preferably arranged in said line. The flow in the burner apparatus and/or a start burner unit can be connected with the flow in the fuel supply unit via the start burner fuel metering arrangement. Fuel can be fed via this start burner fuel line, in particular during a fuel cell system starting or warm-up phase, in order to raise the operating temperature of the system—essentially the reforming apparatus and the vaporizing arrangement—to the level required.

In order to regulate a fuel quantity into the anode feed line, a fuel injection apparatus is advantageously arranged in the anode feed line upstream of the vaporizing arrangement. The quantity of fuel fed can thus be regulated according to the operating phase or by demand and, in particular, introduced in a form which is favorable for the vaporization process in the vaporizing apparatus.

In a variation of the invention, at least one bypass line branches off from the cathode feed line upstream of the first heat exchanger and discharges back into the cathode feed line downstream of the first heat exchanger, whereby a bypass control valve apparatus is advantageously arranged in the bypass line. Doing so enables the regulation of the cathode-side temperature of the medium being fed, or rather the prevention of the air being fed into the cathode from entering the fuel cell at an excessive temperature and causing damage as a result of thermal stresses.

In a further variation of the invention, at least one purge air line branches off from the cathode feed line upstream of the first heat exchanger and discharges into the anode feed line upstream of the reforming apparatus, whereby a purge air control valve apparatus is advantageously arranged in the purge air line. On the one hand, the fuel cell system can be purged via the purge air line after shutdown, for example using air or another medium. Doing so prevents oxidation of the anodes in the system. On the other hand, the starting process or the heating of the fuel cell system can be assisted by using the purge air line since the air being fed via the purge air line assists the reforming reaction. In an exemplary method of operation, the vaporizing apparatus is brought to temperature via the anode exhaust heated by means of a start burner apparatus, whereupon a small amount of fuel is fed into the vaporizing apparatus in order to vaporize said fuel. The fuel, which is now predominantly in a gaseous state, is then fed into the reforming apparatus, whereby air is also fed via the purge air line. An exothermic reaction consequently takes place in the reforming apparatus, whereby hot gas is able to be fed into the anode at an early stage. The fuel cell system heating time can as a result be significantly reduced. Moreover, this exothermic reaction also provides a protective function for the anode since the gas formed thereby displaces the oxygen in the anode.

BRIEF DESCRIPTION OF THE SEVERAL VIEWS OF THE DRAWINGS

The invention is described in greater detail as follows by way of embodiments, which are illustrated in the drawings and are not restrictive. Shown are.

For reasons of clarity, elements of the same kind are identified by the same reference signs in the following drawings.

DESCRIPTION OF SPECIFIC EMBODIMENTS OF THE INVENTION

All of the variations illustrated show a fuel cell system 100 having fuel cells in the form of two fuel cell stacks 1, 2 consisting in each case of a number of fuel cells. The fuel cells each feature an anode 3, 3' and a cathode 4, 4' which are supplied with the necessary operating media via a process gas distributor 5. The individual stacks 1, 2 are thus supplied collectively.

Accordingly, an anode feed line 30 is provided for leading fuel gas or reformed gas to the anode 3, 3', and a cathode feed line 40 is provided for leading—essentially—air or ambient air to the cathode 4, 4'. An anode exhaust line 6 serves for discharging exhaust gas from the fuel cells, for example air and unused fuel gas and additional combustion products, but at least anode exhaust from the anode 3, 3'. The fuel cell stacks 1, 2 are connected to supply or peripheral arrangements, known as the "Balance of Plant" (BOP), via an interface apparatus 7. Among these are components for fuel preparation and feeding, air supply, and electrical components (not further discussed hereinafter).

The plant periphery features a fuel supply unit 8 comprising a fuel tank 9 and a fuel pump 10. Usable as fuel is in particular liquid fuel, usually a liquid hydrocarbon such as natural gas, diesel, or an alcohol. The anode 3, 3' is connected with the fuel supply unit 8 via the anode feed line 30.

The fuel is introduced in liquid form via a fuel injection apparatus 11 into a vaporizing arrangement 12, in which the fuel is vaporized through the application of heat. The vaporized fuel is fed thereafter into a reforming apparatus 13, in which the hydrogen-rich fuel gas or reformed gas that will be converted into electrical energy is generated. During reformation, the fuel is led across the surface of a catalyst either along with added air and/or together with water (vapor) and converted into hydrogen, carbon dioxide, carbon monoxide and vapor: the exact composition of the fuel gas depends in this case upon the fuel being used. Being an endothermic process, steam reforming must as a result have the requisite heat added to it. The higher the reforming temperature and the higher the proportion of water (vapor), the purer the resulting fuel gas or reformed gas must be.

Subsequent to the reforming apparatus 13, the fuel gas or reformed gas is led via the anode feed line 30 to the anodes 3, 3' of the fuel cell stacks 1, 2.

The air necessary for the fuel cell reaction is fed through the cathode feed line 40 by means of an air conveying arrangement—for example a fan 14. A cathode air regulating apparatus 15 is thus provided in the cathode feed line 40 in the form of a control valve, which can be used to regulate the quantity of air being fed to the cathode 4, 4'. To preheat the air being fed to the cathode 4, 4'—in order to both facilitate the reaction and to prevent thermal stresses in the fuel cell stacks 1, 2 resulting from the high temperatures in the anode—a first heat exchanger 16 is provided in the cathode feed line 40, said heat exchanger featuring, in a known manner, a hot side and a cold side, with media at varying temperature levels flowing through these sides, thus enabling heat to be transferred from the hot to the cold side, whereby the heat streams are physically separated. In doing so, the medium being fed to the cathode 4, 4' is led through the cold side of the first heat exchanger 16, then continuing its flow to the process gas distributor 5 or to the cathode 4, 4'.

The variations illustrated show a bypass line 17 branching off from the cathode feed line 40 between the fan 14 and the cathode air regulating apparatus 15. This bypass line discharges again into the cathode feed line 40 downstream of the first heat exchanger 16. A bypass control valve apparatus 18 is provided for regulating the flow through the bypass line 17. Under certain operating conditions, all or part of the cathode air can be led past the first heat exchanger 16 via the bypass line 17, thus enabling regulation of the temperature of the air being fed to the cathode 4, 4'. Doing so can prevent thermal stresses in the fuel cell stacks 1, 2 arising from, for example, the overly rapid heating thereof in addition to preventing damage to the cathode 4, 4' caused by excessively hot air.

In addition, a purge air line 19 branches off from the cathode feed line 40 between the fan 14 and the cathode air control apparatus 15 and discharges into the anode feed line 30 upstream of the reforming apparatus 13, preferably between the vaporizing arrangement 12 and the reforming apparatus 13. Arranged in the purge air line 19 is a purge air control valve apparatus 20, which can be used to regulate the flow through said line as required. Air can be fed to the vaporized fuel via the purge air line 19 in order to assist the reaction in the reforming apparatus 13. This is particularly advantageous during a start-up phase in the fuel cell system 100: The air being fed via the purge air line 19 assists the reforming reaction and shortens the heating time for the system.

The exhaust gases coming from the anode 3, 3' and the cathode 4, 4' are collected in the fuel cell stacks 1, 2 and led via the process gas distributor 5 and the anode exhaust line 6 to an exhaust gas outlet 21, where they are, for example, discharged into the environment.

The exhaust gases leave the fuel cell stacks 1, 2 at high temperatures, which are used according to the invention for increasing overall efficiency.

A burner apparatus 22 is arranged downstream of the process gas distributor 5. On the one hand, fuel can be converted into heat in the burner apparatus 22 during start-up of the fuel cell system 1 in order to quickly bring the fuel cells in the fuel cell stacks 1, 2 up to operating temperature. On the other hand, fuel residues and other reaction products contained in the exhaust gases (in the anode exhaust gases in particular) can be burned in order to ensure a complete transformation.

Figure 1:
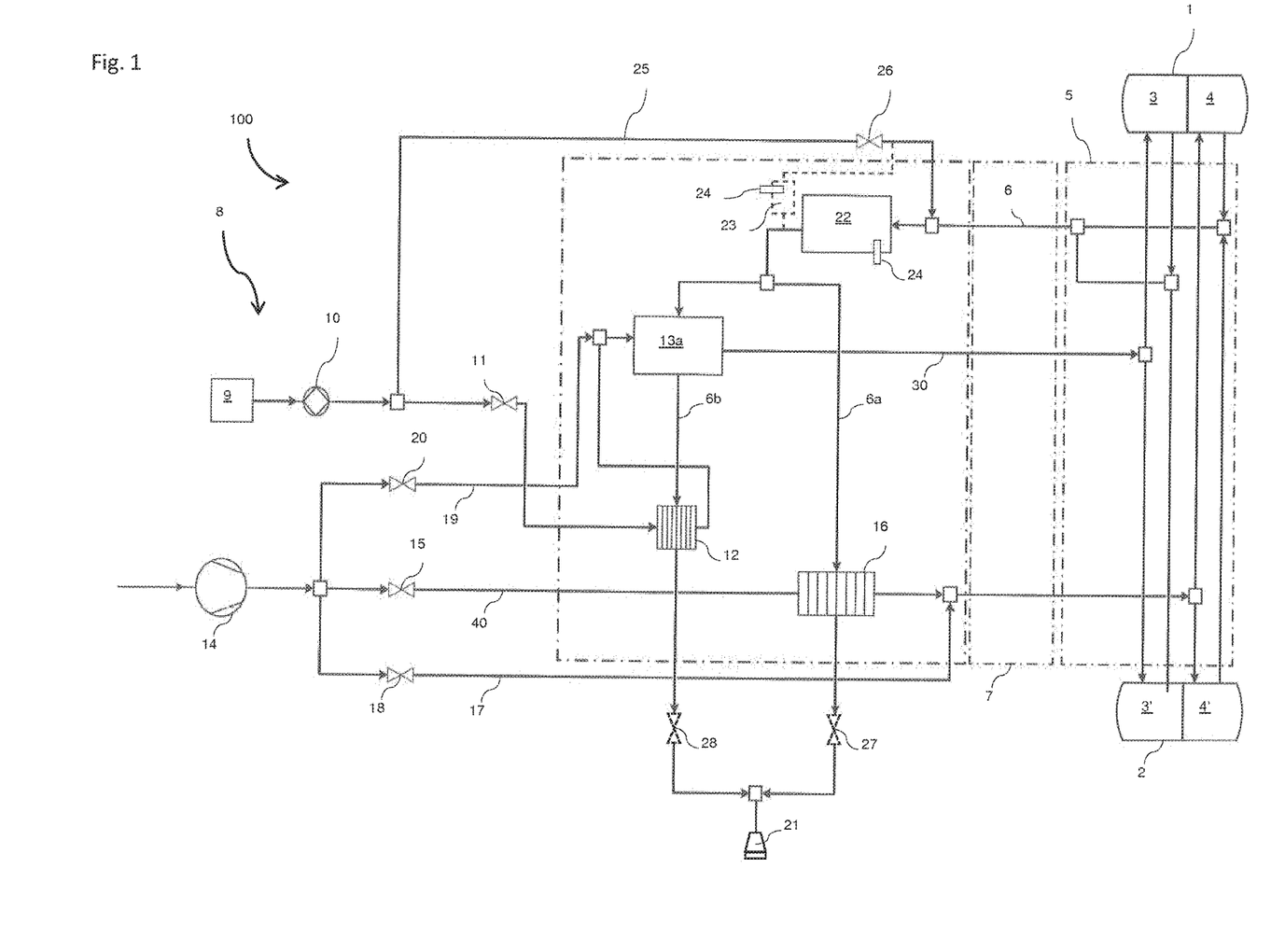
FIG. 1 a schematic view of a first variation of a fuel cell system according to the invention, FIG. 2 a schematic view of a second variation of a fuel cell system according to the invention, and FIG. 3 a schematic view of a third variation of a fuel cell system according to the invention.
Figure 2:
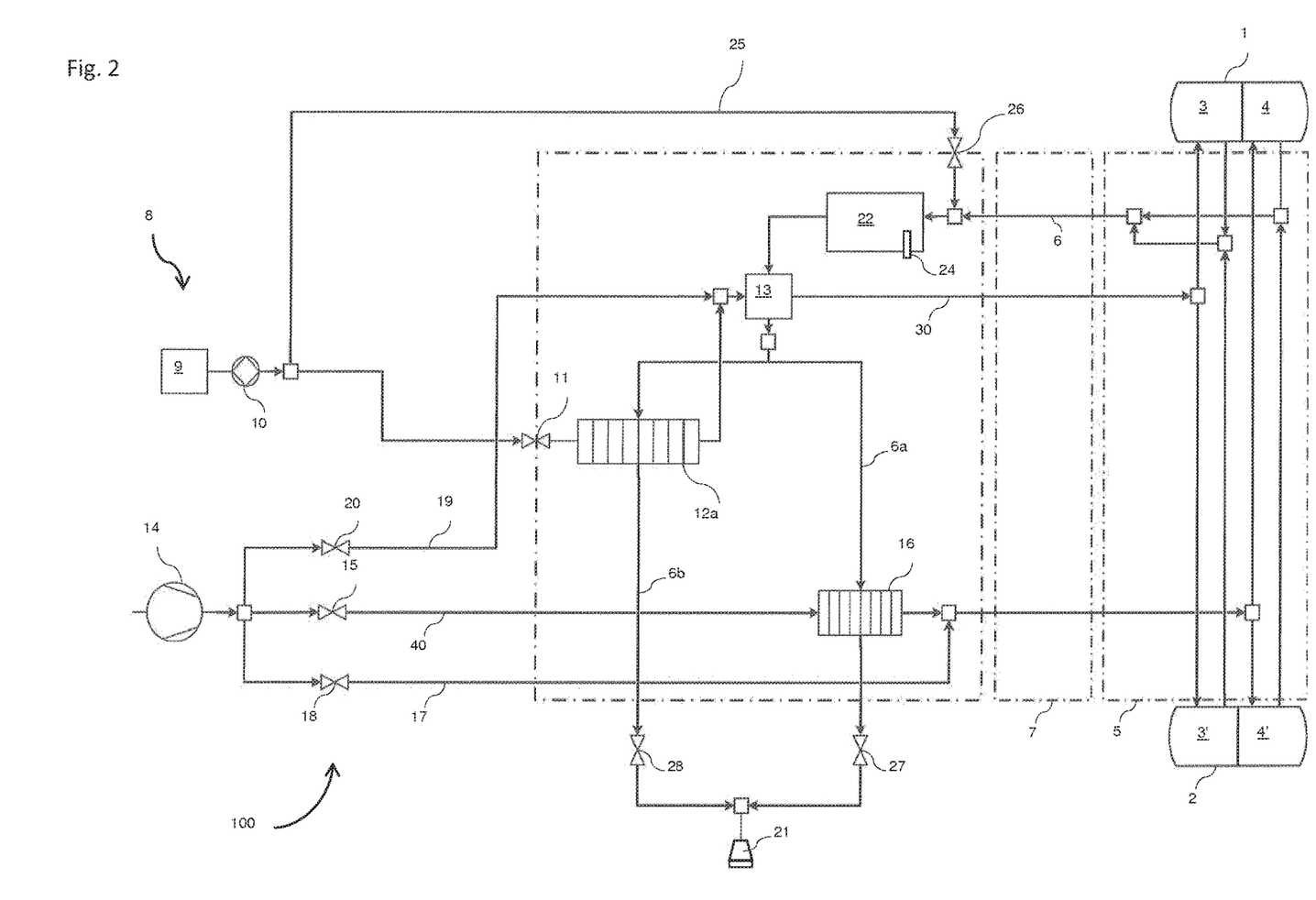
Figure 3:
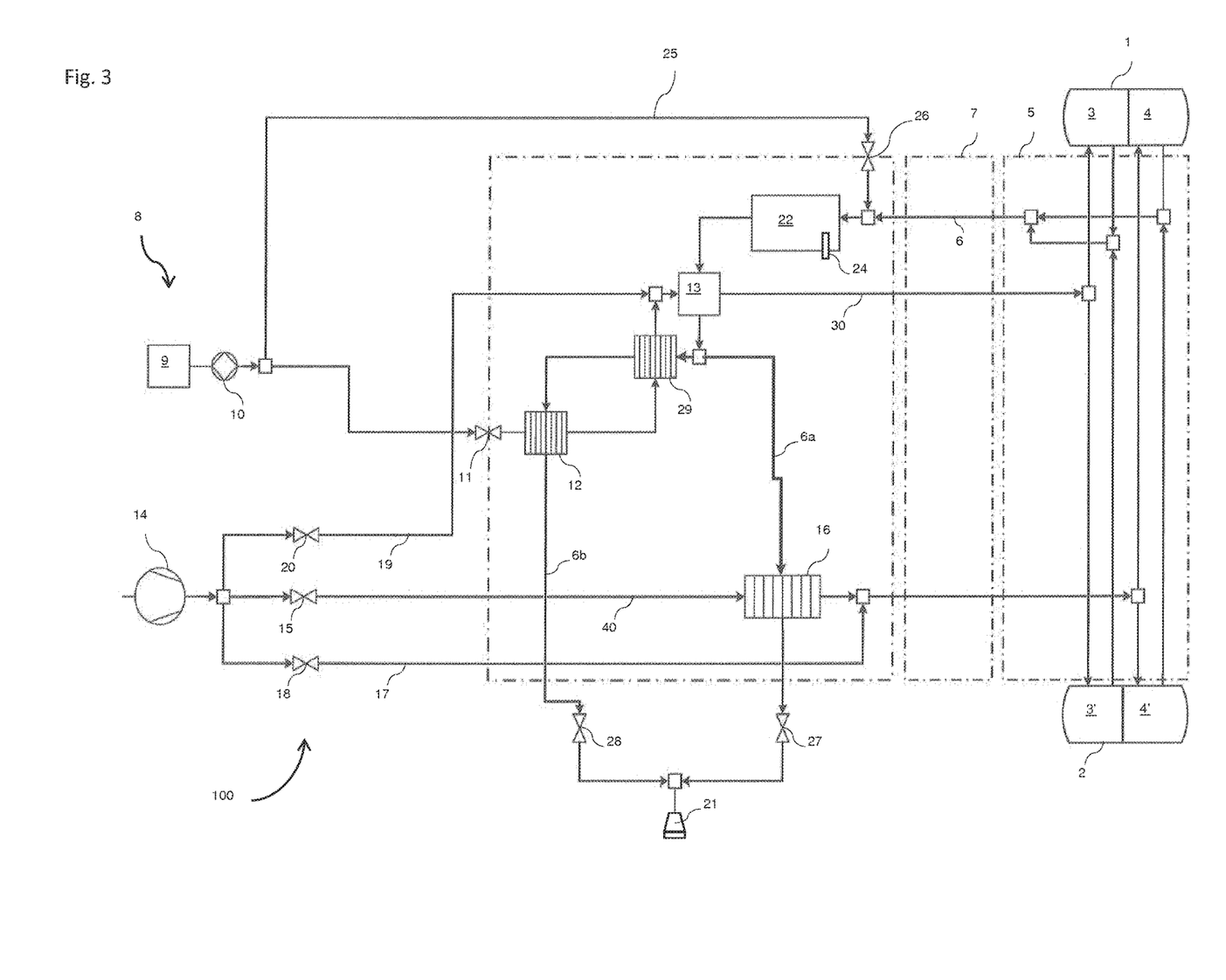

In FIGS. 1 to 3, the burner apparatus 22 is designed as a combined element comprising a catalytic burner ("Oxi-Cat") and a start burner apparatus. The start burner apparatus in this case features an ignition apparatus 24, for example an electrically operated ignitor, using which the fuel can be burned. A start burner fuel line 25 leads from the fuel supply unit 8 to the anode exhaust line 6, where it discharges into the burner apparatus 22. In the embodiments illustrated, the start burner fuel line 25 branches off from the anode feed line 30 between the fuel supply unit 8 and the fuel injection apparatus 11. Also provided in the start burner fuel line 25 is a start burner fuel metering arrangement 26, using which the fuel can be metered or injected. Dashed lines in FIG. 1 show an alternative route for the start burner fuel line 25 subsequent to the start burner fuel metering arrangement 26 and leading to a separate start burner apparatus 23, which is equipped with the ignition apparatus 24 and the combustion products of which are introduced into the anode exhaust line 6 downstream of the burner apparatus 22. Ideally, the ignition apparatus 24 illustrated in the FIG. 1 burner apparatus 22 can be omitted from this variation; the burner apparatus 22 functions only as a catalytic afterburner.

In an exemplary method of operation for the fuel cell system 100 according to the invention, during a starting phase, fuel is fed via the start burner fuel line 25, and the ignition apparatus 24 is activated. Heat is thereby generated in the burner apparatus 22 or in the start burner apparatus 23, thus accelerating the warm-up of the system, in particular via the heat exchangers described hereinafter. As soon as a certain temperature level is reached, the ignition apparatus 24 or the start burner apparatus 23 can be deactivated, and the metering of fuel via the start burner fuel line 25 will be reduced as necessary, but will in any event continue. This is particularly advantageous if the fuel residues and by-products in the exhaust gas from the fuel cell stacks 1, 2 are not yet sufficient for generating adequate heat in the burner apparatus 22. As soon as the fuel cell system 100 has achieved the optimal operating temperature, the metering of fuel via the start burner fuel line 25 can also be discontinued. The time for heating the fuel cell system 100 to its operating temperature can as a result be reduced.

In order to ensure the fullest possible use of the heat from the fuel cell stacks 1, 2, the anode exhaust line 6 divides in accordance with the invention downstream of the burner apparatus 22 into a first anode exhaust subsidiary line 6a and a second anode exhaust subsidiary line 6b, with the two lines terminating at a common exhaust outlet 21. In another variation (not shown), each anode exhaust subsidiary line 6a, 6b can also terminate at its own exhaust outlet. A first control valve apparatus 27 is provided in the first anode exhaust subsidiary line 6a, and a second control valve apparatus 28 is provided in the second anode exhaust subsidiary line 6b for regulating the exhaust gas flow through said anode exhaust subsidiary lines 6a, 6b. Preferably, the control valve apparatuses 27, 28 are arranged as close to the exhaust outlet 21 as possible, where the exhaust gas flowing through the anode exhaust subsidiary lines 6a, 6b is still relatively cool, thus avoiding strict requirements regarding construction, materials and technology—with respect to temperature resistance in particular—for the control valve apparatuses 27, 28, thus allowing them to be built economically.

In FIG. 1, dashed lines are used to indicate the control valve apparatuses 27, 28, which means that, in a variation of the invention, these two control valve apparatuses 27, 28 may be omitted if, namely, the respective exhaust gas flow is able to be adjusted by means of the geometries of the anode exhaust subsidiary lines 6a, 6b, in particular the cross-sections or diameters thereof. Combinations of these variations are also possible, specifically in which various cross-sections as well as one or both of the control valve apparatuses 27, 28 are provided.

The variations illustrated in the drawings are distinguished in particular by the arrangement and routing of the components associated with the exhaust gas.

FIG. 1 shows a variation in which the first anode exhaust subsidiary line 6a leads through the hot side of the first heat exchanger 16 in order to pre-heat or heat the air being fed to the cathode 4, 4'. The anode exhaust gas flowing through the first anode exhaust subsidiary line 6a can in this case be at a temperature of about 720° C. when it enters the first heat exchanger 16, whereby, as a result, the cathode medium (air, for example) on the cold side of the first heat exchanger 16 is heated to as much as 540° C.

The second anode exhaust subsidiary line 6b leads—in the direction of exhaust gas flow—first through a component in which a reforming apparatus 13 and a second heat exchanger 29 are combined into a common superheating and reforming element 13a, and leads thereafter through the vaporizing arrangement 12. Downstream of the fuel injection apparatus 11, the anode feed line 30 leads through the vaporizing arrangement 12, in which the fuel, which is injected at about 30-35° C., is vaporized and heated to about 120° C. before being led through the superheating and reforming element 13a, in which the reformed gas for the fuel cell stacks 1, 2 is generated.

Therefore, in this variation, the exhaust gas coming from the fuel cell stacks 1, 2 at about 600° C. is additionally heated to as much as 720° C. in the burner apparatus 22, which is in the form of a catalytic afterburner, and/or in the start burner apparatus 23 and is first used for superheating and reforming the vaporized fuel. By means of superheating in the second heat exchanger 29, the vaporized fuel is brought to the temperature necessary for reformation, which is greater than 350° C. In addition, in the case of an endothermic reforming reaction—that of steam reformation, for example—the heat provided will be required in the reforming apparatus 13. Both purposes can be fulfilled by supplying the superheating and reforming element 13a with heat from the exhaust gases. Afterwards, the exhaust gas is further led to the vaporizing apparatus 12, where it enters at about 500° C. and where the heat from the exhaust gas is used for vaporizing the fuel.

FIG. 2 shows a variation in which the anode exhaust line 6 leads through the reforming apparatus 13 downstream of the burner apparatus 22 before dividing into the first and the second anode exhaust subsidiary lines 6a, 6b. This has the particular advantage in regard to endothermic reforming reactions of enabling the application of especially large amounts of heat from the exhaust gas. The heat not required for reformation is still available thereafter. The first anode exhaust subsidiary line 6a leads likewise through the hot side of the first heat exchanger 16 in order to heat or pre-heat the air being fed to the cathode 4, 4'. The second anode exhaust subsidiary line 6b then leads through a component in which the vaporizing apparatus 12 and the second heat exchanger 29 are combined into a common component. Therefore, this vaporizing and superheating element 12a combines the vaporizing of the fuel with the superheating thereof to the temperature required for reformation. The fuel in the anode feed line 30 flows first into the vaporizing and superheating element 12a, and from there into the reforming apparatus 13. The reformed or fuel gas is then led to the anodes 3, 3' of the fuel cell stacks 1, 2.

FIG. 3 shows a variation in which, as already shown in FIG. 2, the anode exhaust line 6 leads through the reforming apparatus 13 downstream of the burner apparatus 22 before dividing into the first and the second anode exhaust subsidiary lines 6a, 6b. The advantage in this case is likewise that of assisting the endothermic reforming reactions. Again, the first anode exhaust subsidiary line 6a leads through the hot side of the first heat exchanger 16 in order to heat or pre-heat the air being fed to the cathode 4, 4'. Exhaust gas in the second anode exhaust subsidiary line 6b first flows through the hot side of the second heat exchanger 29, which functions as a superheater, before flowing through the vaporizing apparatus 12 and on to the exhaust outlet 21. The fuel being fed is thus first vaporized in the vaporizing apparatus 12 and fed at about 120° C. into the second heat exchanger 29, where it is superheated and then introduced into the reforming apparatus 13. The optimal utilization of heat energy is ensured by means of the sequence via which the exhaust gas flows through the components mentioned.

Therefore, the solution according to the invention enables the implementation of a fuel cell system 100 having an especially high degree of efficiency. The parallel flows through the anode gas subsidiary lines 6a, 6b results in a lower pressure loss than in conventional systems on the one hand, and allows for precise adjustment of the exhaust gas volumes and, therefore, the heat transfers to the individual gas flows on the other hand. Due to the amounts of heat required in each case, it is advantageous for the mass flow through the first anode exhaust subsidiary line 6a to be greater than the mass flow through the second anode exhaust subsidiary line 6b.

What is claimed is:

1. A fuel cell system comprising a fuel supply unit, at least one fuel cell having one cathode and one anode, wherein the cathode features a cathode feed line, the anode features an anode feed line, the flow in the anode is connected via an anode feed line to the flow in the fuel supply unit, and a reforming apparatus is arranged in the anode feed line, and comprising an anode exhaust line for discharging at least anode exhaust gas from the anode, wherein at least one burner apparatus is arranged in the anode exhaust line,
wherein
at least one first heat exchanger is arranged in the cathode feed line, at least one vaporizing arrangement and a second heat exchanger are arranged in the anode feed line, and the vaporizing arrangement is arranged upstream of the reforming apparatus, wherein the anode exhaust line divides downstream of the burner apparatus into a first anode exhaust subsidiary line that is connected to an exhaust gas outlet and a second anode exhaust subsidiary line that is connected to an exhaust gas outlet, and wherein the first anode exhaust subsidiary line leads through a warm side of the first heat exchanger, and the second anode exhaust subsidiary line leads through a warm side of the second heat exchanger, and the vaporizing arrangement is able to be heated via the second anode exhaust subsidiary line.

2. The fuel cell system according to claim 1, wherein the first anode exhaust subsidiary line and the second anode exhaust subsidiary line lead to a common exhaust gas outlet.

3. The fuel cell system according to claim 1, wherein at least a first control valve apparatus is provided in the first anode exhaust subsidiary line, or a second control valve apparatus is provided in the second anode exhaust subsidiary line.

4. The fuel cell system according to claim 1, wherein the anode exhaust gas being fed into the second anode exhaust subsidiary line flows through the reforming apparatus so as to transfer heat to the reforming apparatus.

5. The fuel cell system according to claim 1, wherein the second heat exchanger is designed as a superheater.

6. The fuel cell system according to claim 1, wherein the second heat exchanger and the reforming apparatus are combined into a common superheating and reforming element.

7. The fuel cell system according to claim 1, wherein the second heat exchanger and the vaporizing arrangement are combined into a vaporizing and superheating element.

8. The fuel cell system according to claim 1, wherein, subsequent in the direction of flow to the burner apparatus, anode exhaust is able to flow through the reforming apparatus prior to the second heat exchanger.

9. The fuel cell system according to claim 1, wherein the anode exhaust line divides downstream of the reforming apparatus into the first anode exhaust subsidiary line and the second anode exhaust subsidiary line, wherein the anode exhaust flows through the reforming apparatus subsequent to the burner apparatus.

10. The fuel cell system according to claim 1, wherein the burner apparatus is a catalytic burner or a start burner unit having an ignition apparatus, or a combined element comprising a catalytic burner and a start burner apparatus.

11. The fuel cell system according to claim 1, wherein a start burner fuel line is provided between the fuel supply unit and the anode exhaust line, with a start burner fuel metering arrangement.

12. The fuel cell system according to claim 1, wherein a fuel injection metering apparatus is arranged in the anode feed line upstream of the vaporizing arrangement.

13. The fuel cell system according to claim 1, wherein at least one bypass line branches off from the cathode feed line upstream of the first heat exchanger and discharges back into the cathode feed line downstream of the first heat exchanger, wherein a bypass control valve apparatus is advantageously arranged in the bypass line.

14. The fuel cell system according to claim 1, wherein at least one purge air line branches off from the cathode feed line upstream of the first heat exchanger and discharges into the anode feed line upstream of the reforming apparatus.

* * * * *